2,851,430
FILM-FORMING COMPOSITIONS FROM OITICICA OIL MODIFIED AND STYRENATED ALKYDS

Kermit B. Niles, Venice, Calif., assignor to Northrop Aircraft, Inc., Hawthorne, Calif., a corporation of California No Drawing. Application December 11, 1953
Serial No. 397,775

10 Claims. (Cl. 260—22)

The present invention relates to fast, air-drying, film-forming compositions, and especially such compositions as a zinc chromate primer particularly suitable as a zinc chromate primer for protecting airplane parts.

Service experience has resulted in many reports of corroded conditions of aluminum alloy airframe structures and parts painted with zinc chromate primer, Specification AN-P-656, the standard primer specification approved for use on Army, Navy and Air Force structures, the letters AN standing for Army and Navy. Primer AN-P-656 consists essentially of zinc chromate, extender, synthetic oil-modified phthalic anhydride type alkyd resin and solvent, the resin content (60% by weight of solids) constituting about 30% by weight of the primer. Alkyd resin, as the term is used here and in commerce, actually is a solution in a suitable volatile solvent of the resin, and the non-volatile solids content by weight is used to express the concentration of resin in solution used and sold as said alkyd resin. The main reason for corrosion appears to be the lack of moisture resistance in the Standard Primer, and the aircraft industry generally has complained of this undesirable characteristic of the AN-P-656 primer.

It is an object of the present invention to provide a film-forming composition from which a primer having improved corrosion resistance can be obtained.

It is a further object of this invention to provide a primer particularly valuable for use on airplane structures and parts which offers greater corrosion resistance, adhesion and resistance to softening under humid conditions than zinc chromate primer, Specification AN-P-656, and which at the same time has all other qualtities requisite for military approval as a standard primer.

I have found that a film-forming composition that is fast drying in air can be obtained by use in the composition of oil-modified phthalic anhydride type alkyd resin and oil-modified styrenated phthalic anhydride type alkyd resin. Heretofore said types of alkyd resins have been found to be incompatible. It has been discovered that by use of certain oils for the oil-modified phthalic anhydride alkyd resin a compatible mixture can be obtained. The oil used for oil modification of the phthalic anhydride type of alkyd resin is oiticica oil alone, or any mixture of at least about 25% oiticica oil and balance any other drying oil such as linseed oil, tung oil, fish oil fraction having a high iodine value, dehydrated castor oil, etc., preferably a mixture of approximately equal parts by weight of linseed oil and oiticica oil, whereas the oil used for oil modification of the styrenated phthalic anhydride type of alkyd resin can be any oil such as enumerated above, but preferably linseed oil, tung oil or mixtures thereof. The following description illustrates the composition of this invention as used in a zinc chromate primer in which the compatibility of said resins is utilized. Of course, the composition not only contains volatile solvents but preferably also contains a resin drier, such as presented below in the illustrative embodiments using the composition in a zinc chromate primer. The range of compatibility is quite wide, e. g., between 30:70 to 80:20 for ratio of oil-modified phthalic anhydride alkyd resin to oil-modified styrenated phthalic anhydride alkyd resin (each on the same basis of solids content) are suitable for the composition of the present invention.

The present invention provides a zinc chromate primer in which the total resin content has been made substantially larger than the amount used in AN-P-656; not, however, by increasing the amount of oil-modified phthalic anhydride resin, but by including substantial amounts of an oil-modified styrenated phthalic anhydride type of alkyd resin of the oxidizing type having a medium oil content or factor of about 36 to 45% by weight, preferably 45%. This larger amount of resin, if entirely of the oil-modified phthalic anhydride type of alkyd resin, would result in an unsatisfactory primer because it would greatly increase the drying time, etc. The oils used for modification are those presented in the next preceding paragraph.

Not only have I found that said resins are compatible when using said oils, but I have found also the use of the combination of resins in the zinc chromate primer raises corrosion resistance provided by the primer to humidity to a new order of magnitude, without unduly prolonging drying time.

The oil-modified phthalic anhydride type of alkyd resin used in the present invention contains at least 25% oiticica oil and balance any drying oil but preferably about equal amounts of linseed oil and oiticica oil to provide a content by weight of 40 to 46% (based on non-volatile solids content) and sufficient glycerol and phthalic anhydride are used in the formulation of the alkyd resin to provide the balance of the resin's non-volatile solids. In the following primer compositions samples of the resin contained 60% by weight non-volatile solids and 40% xylol. The non-volatile solids contained 22.2% linseed oil, 22.2% oiticica oil and 55.6% glyceryl phthalate (all percentages by weight). The resin as said 60% solution in xylol had a specific gravity between 1.015 and 1.025, a color (Gardner color wheel 1933) of 15 maximum, a viscosity (Gardner-Holdt tube) of Z1-Z-3, a cure between 12 and 17 seconds, and an acid number between 15 and 18. Of course, the fatty acids of these oils can be used in appropriate amounts along with adjustment of the amount of glycerol.

The oil-modified styrenated phthalic anhydride type of alkyd resin used in this invention uses any drying oil, as mentioned, e. g., linseed oil, tung oil, or mixtures thereof to impart the oil modification. Their free fatty acids can be used with suitable adjustment of glycerol content. Preferred and satisfactory oil-modified styrenated phthalic anhydride type of alkyd resins are at present available on the open market under the trademark Cycopol, made by the American Cyanamid Company, or under the trademark Styresol, made by Reichhold Chemical Company. Cycopol is described as a copolymer of styrene and alkyd in the publication "Annotated Comprehesive List of Trade Names of Synthetics" by the Research Association of British Rubber Manufacturers, Information Bureau Circular No. 372, published at 105 Lansdowne Road, Croydon, England, in October, 1949. Styresol is defined in that publication as a styrenated alkyd resin solution.

It is to be noted that both resins are oil-modified. In the proportions hereinafter set forth in the illustrative embodiment for the accomplishment of the desired result of the present invention, the combined oil content would ordinarily be considered to be much too high and to be an over-balance by an amount that would ordinarily produce an after-tack that would slow down the drying for an impractical length of time.

The zinc chromate primer of the present invention contains a volatile hydrocarbon solvent, the oil-modified phthalic anhydride type of alkyd resin and the oil-modified styrenated phthalic anhydride type of alkyd resin in a wide ratio, such as between about 45:55 and 70:30, each resin based upon a solution containing 60% solids. In addition the primer contains zinc chromate in an amount between about 22 and 32% by weight of the total weight of resins (calculated as 60% solids) and zinc chromate. A drier, such as a metal naphthenate, in an amount of about 0.5 to 2% by weight based upon content of the oil-modified phthalic anhydride type of alkyd resin (60% solids) is suitable. This amount of drier in the case of metal naphthenate is based upon the concentrations of metal naphthenate in the commercially-available material. For example, when using lead naphthenate containing 24% lead and cobalt naphthenate containing 6% cobalt, a weight ratio of 2:1 is usually used. Other satisfactory metal naphthenates are those others also suitable as driers for drying oils, e. g., zinc and manganese naphthenates, and combinations of any of these naphthenates. Of course, other catalysts for drying oils, such as cobalt and lead oleates, resinates and linoleates, can be used as driers herein.

A flatting agent, such as magnesium silicate, can be used along with a setting regulator, such as aluminum stearate. When using magnesium stearate or other flatting agent it is present preferably in amount of about 18% by weight of the zinc chromate content. The setting regulator as aluminum stearate is used in an amount of about 1.5% by weight of zinc chromate content. It is preferably added as a 10% aluminum stearate gel in xylol so that the amount of gel used is about 15% of the zinc chromate content. Other common flatting agents are suitable in these primers and include metal stearates such as magnesium, zinc, calcium and aluminum stearates in which the aluminum content is higher than that of aluminum stearate used as setting regulator. Flatting agents are minute particles of irregular shape which are insoluble in a vehicle so that the deposited film will exhibit less gloss because the flatting agent reflects light in a diffuse manner.

It has been found that the usual alkyd resin driers described above do not react properly with the oil-modified styrenated phthalic anhydride type alkyd resins to produce a fast drying time and, in fact, tend to react the opposite way, i. e., to delay drying time when added directly to the oil-modified styrenated phthalic anhydride type of alkyd resins. It was discovered further that this deleterious effect can be eliminated by making the compositions of this invention as follows:

A solution of the oil-modified phthalic anhydride type of resin and all of the drier in the volatile hydrocarbon solvent is prepared. In making the primer of this invention zinc chromate, flatting agent and setting regulator can be used in formulating this solution. The solution is mixed with a solution in a volatile hydrocarbon solvent of the oil-modified styrenated phthalic anhydride alkyd resin. The drier in the resultant combination and provided by the first solution has been found to function to produce a rapid drying time for the composition.

The following description illustrates the present invention as applied to zinc chromate primer and the novel method above described of making such compositions. Two solutions, Portions #1 and #2, were prepared to contain materials as follows:

| Portion #1 | Percent by weight |
|---|---|
| Zinc chromate | 28.5 |
| Magnesium silicate | 5.0 |
| Oil-modified phthalic anhydride resin containing 60% solids | 45.85 |
| 10% aluminum stearate gel in xylol | 4.0 |
| Mixture of lead naphthenate containing 24% metal and cobalt naphthenate containing 6% metal | 0.5 |
| Solvent | 16.15 |
| | 100.00 |

| Portion #2: | Percent by weight |
|---|---|
| Oil-modified styrenated phthalic anhydride alkyd resin containing 60% solids | 35.5 |
| Toluene | 64.5 |
| | 100.00 |

The oil-modified phthalic anhydride alkyd resin and the oil-modified styrenated phthalic anhydride alkyd resin used are those described above as being compatible. The two portions as set forth above are combined with a preferred ratio of 70% of Portion #1 and 30% of Portion #2. The preferred useful range as a primer has been found to be from about 70 to 40% of Portion #1 with the balance being Portion #2. Of course, the solvent content of the final formulation can be varied widely. For spraying operation the compositions described above can be diluted with twice its volume of solvent, such as toluol.

The preferred zinc chromate primer above thus has the following composition (by weight) (based on 70% of Portion #1 and 30% Portion #2):

| | |
|---|---|
| Zinc chromate | 19.95 |
| Magnesium silicate | 3.5 |
| 10% aluminum stearate gel in xylol | 2.8 |
| Oil-modified phthalic anhydride alkyd resin containing 60% solids | 32.1 |
| Oil-modified styrenated phthalic anhydride alkyd resin containing 60% solids | 10.65 |
| Mixture of lead naphthenate containing 24% metal and cobalt naphthenate containing 6% metal | 0.35 |
| Xylene | 11.30 |
| Toluene | 19.35 |
| | 100.00 |

The primer of this composition, when sprayed on metal, such as aircraft aluminum alloy sheets, for example, air dries at room temperature to touch in 3 to 5 minutes, and "stack dries" in 30 minutes. It is seen from the foregoing that the final primer, having an unusually high resin content, an unusually high oil content, yet at the same time dries within a reasonable and practical period.

A large number of tests have been made to determine the efficiency of the primer of the present invention. The preferred primer composition described above (70% of Portion #1 and 30% of Portion #2) was sprayed on aluminum alloy (24 ST and 75 ST) and the resulting products after drying were exposed to standard accelerated salt spray test and found to be unaffected at the end of 3,000 hours, whereas the standard AN–P–656 oil-modified phthalic anhydride alkyd zinc chromate primer failed to protect the aluminum alloy against corrosion in said test after 300 to 500 hours. As another example of the tough qualities of the primer of the present invention, it has been found that it will resist standard paint removers three times as long as the AN–P–656 primers.

While in the foregoing description of the embodiment of the compositions of the present invention, including the primers, is used phthalic anhydrides as the dicarboxylic acid ingredient in making the alkyd, isophthalic acid and terephthalic acid can be used as partial or entire substitutes without changing the relative amounts of materials in the alkyds or in the styrenated alkyd, and the term phthalate is generic for all three compositions. Similarly other polyhydric alcohols (i. e., alcohols containing more than two hydroxyl alcoholic groups) than glycerol can be used, e. g., pentaerythritol, trimethylol ethane and trimethylol propane can be used.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

This application is a continuation-in-part of my co-pending application entitled "Zinc Chromate Primer," Serial No. 207,429, filed January 23, 1951, now abandoned.

While in order to comply with the statute, the invention has been described in language more or less specific as to structural features, it is to be understood that the invention is not limited to the specific feaures shown, but that the means and construction herein disclosed comprise a preferred form of putting the invention into effect, and the invention is, therefore, claimed in any of its forms or modifications within the legitimate and valid scope of the appended claims.

What is claimed is:

1. A fast air-drying film-forming composition of matter containing an oil-modified phthalate alkyd resin, the oil content of said resin on a solids basis being about 25% oiticica oil and about 75% of a drying oil selected from the group consisting of oiticica oil, linseed oil, tung oil, fish oil fraction having a high iodine value, and dehydrated castor oil and mixtures thereof, an oil-modified styrenated phthalate alkyd resin, the oil content of said oil-modified styrenated phthalate alkyd resin being selected from a drying oil selected from the group consisting of oiticica oil, linseed oil, tung oil, fish oil fraction having a high iodine value, and dehydrated castor oil and mixtures thereof, a drier, and a volatile aromatic hydrocarbon solvent, a film of said composition quickly air-drying to produce a non-tacky film, in said composition the ratio of the oil-modified phthalate alkyd resin to the oil-modified styrenated phthalate alkyd resin on the same solids basis is between 30:70 and 80:20, the oil content of the oil-modified phthalate alkyd resin is 40 to 46% by weight based on the non-volatile solids content and the oil content of the oil-modified styrenated phthalate alkyd resin is 36 to 45% by weight based on the non-volatile solids content.

2. The composition of claim 1 in which the drier is a metal naphthenate.

3. The composition of claim 2 in which the metal naphthenate is a mixture of lead naphthenate and cobalt naphthenate.

4. The composition of claim 1 in which the oil content of the oil-modified phthalate alkyd resin is a mixture of approximately equal parts of oiticica oil and linseed oil.

5. A zinc chromate primer containing zinc chromate, an oil-modified phthlate alkyd resin, the oil content of said resin on a solids basis being 25% oiticica oil and 75% of a drying oil selected from the group consisting of oiticica oil, linseed oil, tung oil, fish oil fraction having a high iodine value, and dehydrated castor oil and mixtures thereof, an oil-modified styrenated phthalate alkyd resin, the oil content of said oil-modified styrenated phthalate alkyd resin being a drying oil selected from the group consisting of oiticica oil, linseed oil, tung oil, fish oil fraction having a high iodine value, and dehydrated castor oil and mixtures thereof a drier, and a volatile aromatic hydrocarbon solvent, a film of said primer quickly air-drying to a non-tacky film, in said primer, the ratio of the oil-modified phthalate alkyd resin to the oil-modified styrenated phthalate alkyd resin on the same solids basis is between 30:70 and 80:20, the oil content of the oil-modified phthalate alkyd resin is 40 to 46% by weight based on the non-volatile solids content of said resin and the oil content of the oil-modified styrenated phthalate alkyd resin is 36 to 45% by weight based on the non-volatile solids content of said resin.

6. The primer of claim 5 in which the oil content of oil-modified phthalic anhydride alkyd resin is a mixture containing approximate equal amounts of oiticica oil and linseed oil and in which the ratio is between 45:55 and 70:30.

7. The primer of claim 5 in which the primer also contains magnesium silicate as a flatting agent and aluminum stearate as a setting regulator.

8. The composition of claim 1 in which the volatile organic solvent is a mixture of toluene and xylene and the oil content of the oil-modified phthalate alkyd resin is a mixture of approximately equal parts of oiticica oil and linseed oil.

9. The composition of claim 8 in which the composition also contains zinc chromate, magnesium silicate as a flatting agent and aluminum stearate gel as a setting regulator.

10. A zinc chromate primer containing zinc chromate, an oil-modified phthalate alkyd resin containing on a solids basis 40 to 46% by weight of a mixture of about equal amounts of oiticica oil and linseed oil, an oil-modified styrenated phthalate alkyd resin containing 36 to 45% linseed oil, the ratio of said resins on the same solids basis being between 45:55 and 70:30, a drier, and a mixture of toluene and xylene as a volatile aromatic hydrocarbon solvent for said resins.

References Cited in the file of this patent

UNITED STATES PATENTS

| 2,424,730 | Balassa | July 29, 1947 |
| 2,586,652 | Hewitt et al. | Feb. 19, 1952 |

FOREIGN PATENTS

| 591,986 | Great Britain | Sept. 4, 1947 |

OTHER REFERENCES

Kappelmaier, Paint Technology, November 1950, pp. 477–483.

Daniel, Official Digest, September 1952, pp. 611–620.